Figure 1:
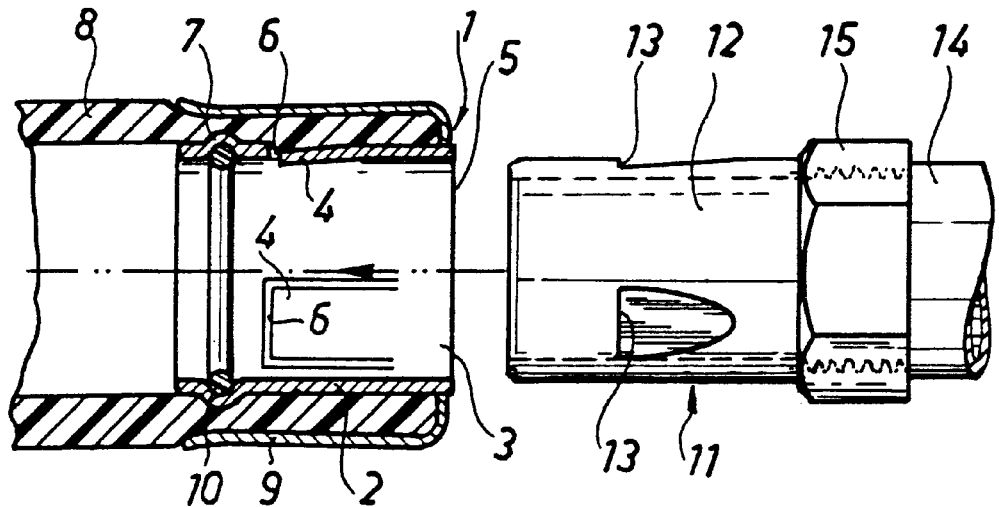

United States Patent

Ryhman

[11] Patent Number: 5,988,704
[45] Date of Patent: Nov. 23, 1999

[54] HOSE COUPLING DEVICE

[75] Inventor: Morgan Ryhman, Anderstorp, Sweden

[73] Assignee: ABA of Sweden AB, Anderstrop, Sweden

[21] Appl. No.: 09/101,311

[22] PCT Filed: Dec. 27, 1996

[86] PCT No.: PCT/SE96/01752

§ 371 Date: Jul. 2, 1998

§ 102(e) Date: Jul. 2, 1998

[87] PCT Pub. No.: WO97/24545

PCT Pub. Date: Jul. 10, 1997

[30] Foreign Application Priority Data

Jan. 2, 1996 [SE] Sweden ................................. 9600008

[51] Int. Cl.⁶ ........................................................... F16L 37/08
[52] U.S. Cl. .......................... 285/307; 285/256; 285/319; 285/906; 285/921
[58] Field of Search ...................................... 285/319, 307

[56] References Cited

U.S. PATENT DOCUMENTS

| | | | |
|---|---|---|---|
| 4,696,497 | 9/1987 | Schwarzensteiner | ................... 285/307 |
| 4,969,668 | 11/1990 | Sauer | ................... 285/319 X |
| 4,978,149 | 12/1990 | Sauer | ................... 285/319 X |
| 5,082,315 | 1/1992 | Sauer | ................... 285/319 X |
| 5,215,339 | 6/1993 | Morse et al. | ................... 285/319 X |

*Primary Examiner*—Dave W. Arola
*Attorney, Agent, or Firm*—Dvorak & Orum

[57] ABSTRACT

The invention relates to a hose coupling device, which comprises a male part connectable to a female part. The female part consists of a sleeve, which is provided with a number of resilient tongues extending in equally spaced relationship along the inner wall of the sleeve and protruding inwards form the inner wall and directed away from the mouth of the sleeve. The male part consists of a tube portion with transverse edges in its outer wall. At the insertion of the male part into the female part the resilient tongues are arranged to resiliently snap into place behind the transverse edges of the male part and hence connect the female part to the male part. The parts can be separated by turning them relative to one another to a position where the resilient tongues assume a position laterally of the transverse edges.

5 Claims, 4 Drawing Sheets

HOSE COUPLING DEVICE

The invention relates to a hose coupling device, comprising a male part and a female part, which are interconnectable.

Many different types of couplings are known, which are intended to interconnect two hose-pipes or a hose and a tube. However, all the known embodiments have that in common, that one coupling part, which for example is attached to the end of a hose by a hose clamp, forms a protruding part at the end of the hose. This protruding part is provided with means for connecting the end of the hose to another coupling part which is mounted on a tube or another hose. Known hose coupling types can therefore be seen as unnecessarily complicated and hence expensive constructions.

According to the invention, a hose coupling has been provided, in which the female part is insertable into the end portion of a hose and said female part is provided with means for holding the male part after the insertion thereof into the female part. Hence, a very compact hose coupling is provided, which is reliable and at the same time cheap to manufacture. The characteristics of the device according to the invention are described in the appended claims.

Figure 2:
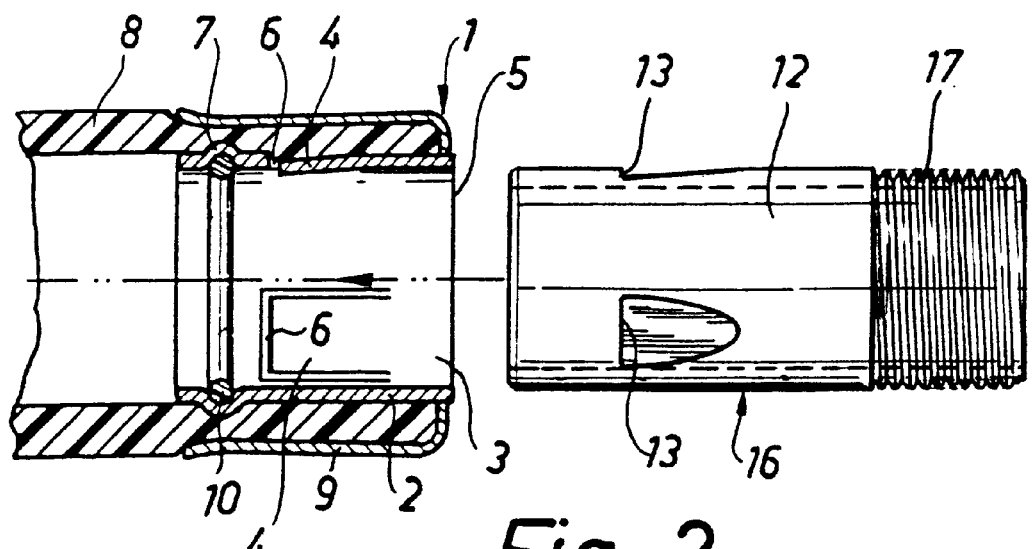
Figure 3:
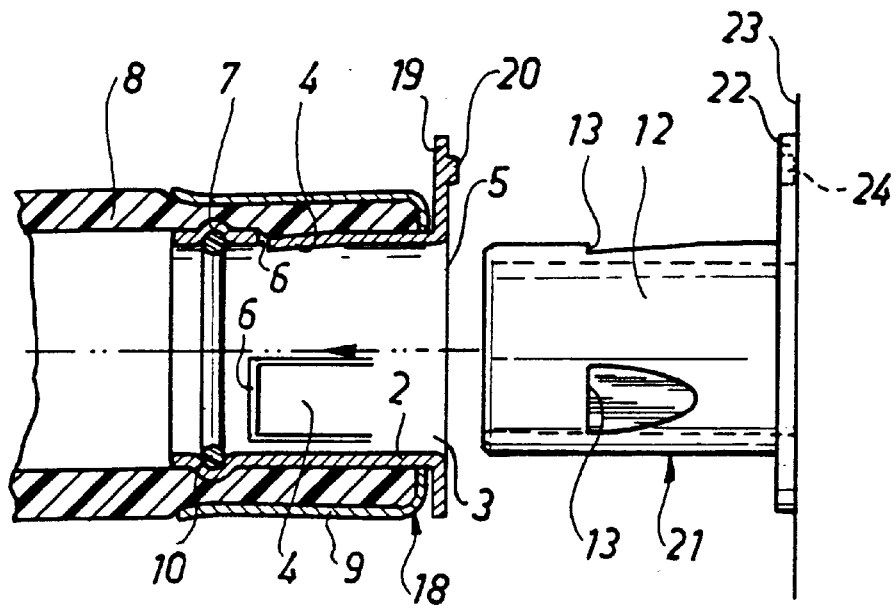
Figure 4:
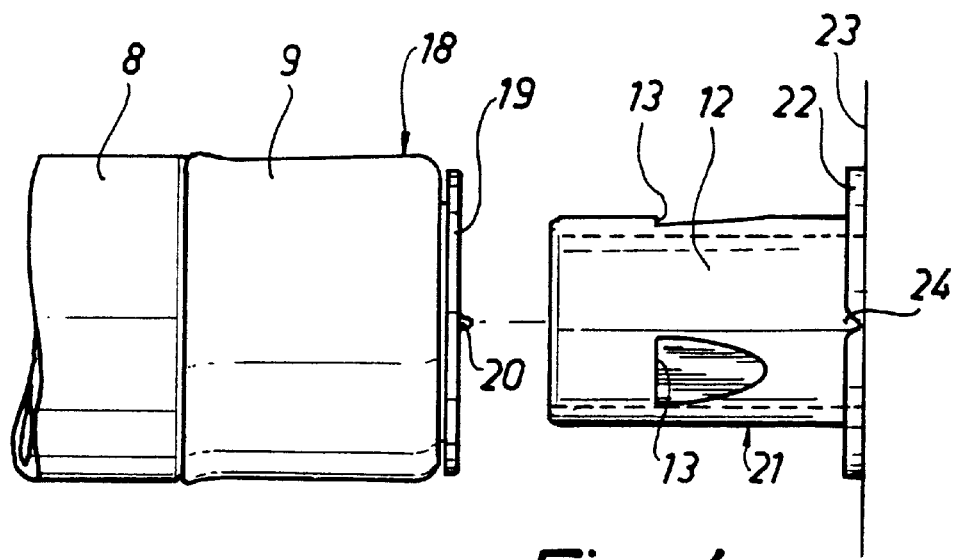
Figure 5:
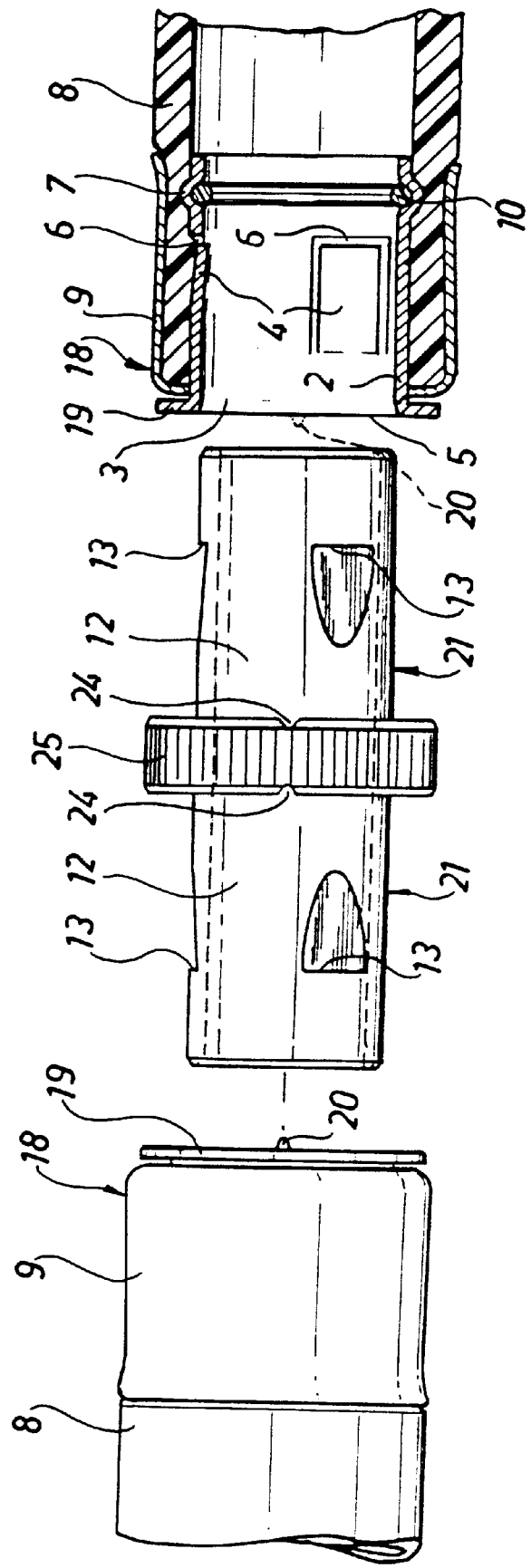
Figure 7:
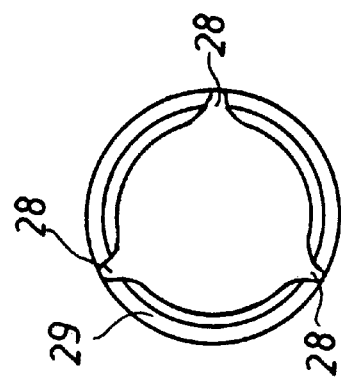
Figure 6:
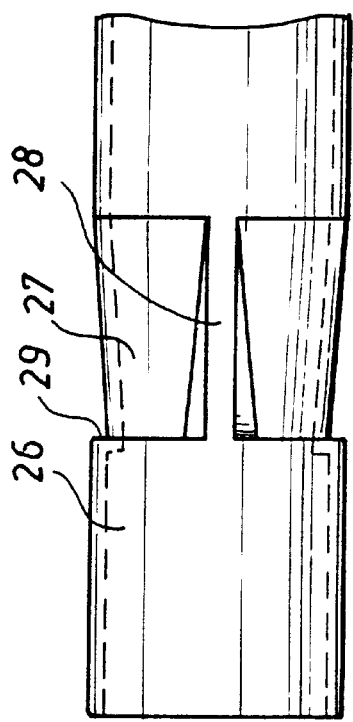
Figure 8:
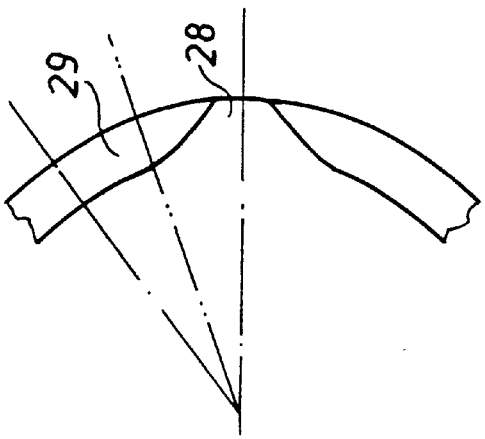

In the following, the invention will be described in more detail with reference to the accompanying drawings, in which FIG. 1 is a longitudinal sectional view of a female part according to the invention and a lateral view of a male part according to one embodiment of the invention, FIG. 2 is a longitudinal sectional view of the same female part as in FIG. 1 and a lateral view of a male part according to a second embodiment of the invention, FIG. 3 is a longitudinal sectional view of a female part according to a second embodiment of the invention and a lateral view of a male part according to a third embodiment of the invention, FIG. 4 is a lateral view of a female part and a male part according to the same embodiment as in FIG. 3, FIG. 5 illustrates one embodiment comprising two male parts which have been joined together as seen in a lateral view and a first female cart as seen in a lateral view for connection from the left as seen in the figure and a longitudinal sectional view of a second female part for connection from the right as seen in the figure, FIG. 6 is a lateral view of a male part according to a fourth embodiment, FIG. 7 is an end view of the same embodiment and FIG. 8 illustrates on a larger scale and schematically a part of the male part in order to illustrate its possibilities of turning within the female part.

According to the invention, the device comprises a female part 1, the main component of which is a sleeve 2, which may be made for example of a tube of sheet metal or of extruded plastics. This sleeve 2 is provided with several resilient tongues 4 uniformly spaced around the inner wall of the sleeve 3, which in the embodiment illustrated are equally spaced from the mouth 5 of the sleeve 2 and directed away therefrom and protruding inwards somewhat from the inner wall 3. Preferably, the resilient tongues 4 are made by punching of slits 6 in the wall of the sleeve 3. At its inner portion, as seen from the mouth 5, the sleeve 2 is provided with a bead 7. When applying a hose 8 over the sleeve 2, the bead 7 forms a ring-shaped external stopping edge, which penetrates into the hose material. An outer sleeve 9 is applied over the end of the hose and is pressed to holding around the end portion of the hose. The material of the hose 8 will then on the one hand be lockingly compressed around the bead 7, and on the other hand, resiliently press the tongues 4 somewhat into the sleeve 2 and increase the spring force thereof. Inside the sleeve 2 the bead 7 forms a ring-shaped track, into which a sealing ring 10 is applied. Hence, the female part 1 will mainly be built into the end portion of the hose 8.

The male part 11 in FIG. 1 is a tube part, which is provided with a number of transverse edges 13, corresponding to the number of resilient tongues 4, in its outer wall 12. These transverse edges 13 may for example be formed by the cutting off of material in the outer wall 12. They could also be formed by press moulding the material or—if the male part 11 is made from plastics—be formed through injection moulding of the male part 11. In the embodiment of the male part 11 shown in FIG. 1, the male part is attached to an externally threaded tube 14 by means of a flange nut 15.

When inserting the male part 11 into the female part 1 in the correct angular position so far, that the front section of the male part presses past the sealing ring 10, the resilient tongues 4 will snap into place behind the transverse edges 13 of the male part 11, locking the male part to the female part. Hence, this coupling of the female part 1 to the male part 11 forms a bayonet coupling.

Because the outer sleeve 9 pressingly abuts against the end portion of the hose, the resilient tongues 4 will be pressed between the male part 11 and the resilient hose material. Consequently, the resilient tongues 4 can be made longer than if they had been lying free, and a relatively small mounting force is then required when connecting the male part 11 to the female part 1. Simultaneously, the coupling can be exposed to a relatively large pulling force without the risk of the resilient tongues 4 bending and the coupling coming apart.

When separating the male part 11 from the female part 1, the parts 1 and 11 are turned relative to one another so far, that the resilient tongues 4 will assume a position laterally of the transverse edges 13, and the male part 11 can then be pulled out of the female part 1.

In FIG. 2 an embodiment is illustrated where the female part 1 is identical to that of the embodiment in FIG. 1 but the male part 16 is provided with a threaded portion 17 which is intended to be screwed into a machine of some kind, for example a pump.

In FIGS. 3 and 4 an embodiment is illustrated, where the female part 18 is formed at its mouth 5 with a transverse flange 19, said flange having a nose 20. In this embodiment the male part 21 is provided with a corresponding transverse flange 22, by means of which the male part 21 is attached to a wall 23 of a machine of some kind. When connecting the female part 18 to the male part 21 and turning the female part 18 into a position, in which each resilient tongue 4 snaps into place behind a transverse edge 13, the nose 20 is simultaneously arranged to engage in a notch 24 in the transverse flange 22 of the male part 21. In this manner one gets a clear visual indication of the two parts 18 and 21 being coupled together without having to listen particularly for the snapping sound, when the resilient tongues 4 engage the rear faces of the transverse edges 13, or having to check the coupling by trying to pull the parts apart.

In FIG. 5 an embodiment is shown in which two male parts 21 are directed away from each other, separated by a middle flange 25 with one notch 24 pointing in each direction. According to this embodiment the coupling is effected in the same way as according to the embodiment last described, that is, a female part 18 is applied onto the male part 21 from each side and is turned, until the nose 20 on each female part 18 engage in its associated notch 24 in the middle flange 25. This embodiment is an example of how joining two hose-pipes 8 can be carried out rapidly.

In FIGS. 6 and 7 an embodiment is illustrated, where the male part 26 has been designed with such large depressed areas 27 that the remaining sections, having full width, form bars 28 that are equally spaced around the male part 26. The transverse edge portions 29 which extend between the bars 28 thus become considerably larger than according to the above described embodiments of the male part, that is, they extend over a longer part of the circumference of the male part 26, as seen in FIGS. 7 and 8. As is desirable in certain situations, this makes it possible to rotate the male and female parts relative to one another over a longer section, before the resilient tongues 4 of the female part are transferred up onto the bars 28 and the parts can be separated.

The invention is not limited to the embodiments illustrated and described but can be varied in many ways within the scope of the appended claims. The directions for the correct relative turning position of female part and male part for connecting the parts can of course be carried out differently than by way of the nose 20 and the notch 24, for example with scribed lines or colour markings in the material.

I claim:

1. A hose coupling device for joining two members together, comprising:

a male part inserted within a female part, said female part comprising a generally cylindrical and open female sleeve having an interior other end, said sleeve having an inner wall and an outer wall, a first end and a second end, said first end defining a mouth of said sleeve, said second end having a circumferential protuberance which forms a ring-shaped external stopping edge, said sleeve including a plurality of longitudinal directed resilient tongues circumferentially arranged around said sleeve between said stopping edge and said mouth, each said tongue corresponding to an individual slit through said inner and outer walls and protruding inwardly of said sleeve interior, said first end including an outer sleeve attached to said outer wall of said sleeve and circumferentially surrounding said female sleeve, said outer sleeve and said female sleeve defining an annular opening for receiving therein an end of a hose, wherein when said hose is retained between said female and outer sleeves, said hose is compressed around said stopping edge and wherein said tongues are resiliently pressed by said hose inwardly of said female sleeve to increase a spring force of said tongues;

an O-ring received within said circumferential protuberance, said O-ring projecting into said interior of said female sleeve;

said male tube part having a first and a second end and an outside and inside surface, said first end including a plurality of circumferentially displaced cut-outs formed in said outer surface, said plurality of cut-outs corresponding to said number of tongues, each of said cut-outs longitudinally oriented and presenting an individual transverse edge surface which interlocks against a tongue of said female sleeve when said male tube part is inserted within said interior of said female part, and wherein said outer surface of said first end is in close contact against said O-ring within said interior of said female sleeve, whereby said transverse edges and tongues form a snap-lock connection which is disconnectable only when said male tube part is rotated relative to said female sleeve such that said tongues of said female part disengage from said transverse edges of said male part.

2. The device according to claim 1, wherein the female part further includes a transverse flange surrounding said mouth and the male part includes a flange attached about the exterior thereof, said flange oriented transversely to said male part, wherein said transverse flange on said female part includes a nose thereon and said flange on said male part includes a notch for receiving said nose when said female part is snap-locked to said male part.

3. The device according to claim 1, wherein the transverse edges of the male part are formed by grinding off material in the outer surface of the male part.

4. The device according to claim 1, wherein the transverse edges of the male part are made by pressing the outer surface downwardly.

5. The device according to claim 1, wherein the transverse edges of the male part are formed through injection molding.

* * * * *